US012690034B2

(12) United States Patent　　(10) Patent No.:　US 12,690,034 B2
Liu　　(45) Date of Patent:　Jul. 21, 2026

(54) METHOD AND DEVICE FOR OPEN LOOP POWER CONTROL OF UPLINK CG PUSCH, AND STORAGE MEDIUM

(71) Applicant: Beijing Xiaomi Mobile Software Co., Ltd., Beijing (CN)

(72) Inventor: Yang Liu, Beijing (CN)

(73) Assignee: Beijing Xiaomi Mobile Software Co., Ltd., Beijing (CN)

( * ) Notice: Subject to any disclaimer, the term of this patent is extended or adjusted under 35 U.S.C. 154(b) by 400 days.

(21) Appl. No.: 18/551,309

(22) PCT Filed: Mar. 31, 2021

(86) PCT No.: PCT/CN2021/084734
§ 371 (c)(1),
(2) Date: Sep. 19, 2023

(87) PCT Pub. No.: WO2022/205213
PCT Pub. Date: Oct. 6, 2022

(65) Prior Publication Data
US 2024/0172225 A1　　May 23, 2024

(51) Int. Cl.
*H04W 72/1268*　　(2023.01)
*H04W 52/10*　　(2009.01)
(Continued)

(52) U.S. Cl.
CPC ....... *H04W 72/1268* (2013.01); *H04W 52/10* (2013.01); *H04W 72/232* (2023.01); *H04W 76/20* (2018.02)

(58) Field of Classification Search
CPC ............... H04W 52/10; H04W 72/232; H04W 72/1268; H04W 76/20
See application file for complete search history.

(56) References Cited

U.S. PATENT DOCUMENTS 12,225,522 B2 *　2/2025　Yi ......................... H04L 5/0023
2019/0364511 A1　11/2019　Chen et al.
(Continued)

FOREIGN PATENT DOCUMENTS

| CN | 109474311 A | 3/2019 |
| CN | 112583523 A | 3/2021 |
| WO | 2021026683 A1 | 2/2021 |

OTHER PUBLICATIONS

International Search Report and Written Opinion of International Application No. PCT/CN2021/084734, dated Nov. 12, 2021, 18 pages.
(Continued)

*Primary Examiner* — Melanie Jagannathan
(74) *Attorney, Agent, or Firm* — Finnegan, Henderson, Farabow, Garrett & Dunner, L.L.P.

(57)　　ABSTRACT
A method for open-loop power control of an uplink configured grant (CG) physical uplink shared channel (PUSCH) is performed by a network device, and includes: configuring and determining open loop power boosting parameters corresponding to one or more transmission reception points (TRPs); and sending indication information, wherein the indication information is configured to indicate open loop power boosting parameters for a CG PUSCH configuration adopted by a single TRP independent transmission or a multi-TRP cooperative transmission of a transport block (TB).

15 Claims, 4 Drawing Sheets

TRP1　　　　　　　TRP2 terminal 1(URLLC and eMBB)　　　　　terminal 2(eMBB)

(51) Int. Cl.
   *H04W 72/232*   (2023.01)
   *H04W 76/20*    (2018.01)

(56)                References Cited

U.S. PATENT DOCUMENTS

| 2020/0008155 | A1  | 1/2020 | Li et al. | |
|---|---|---|---|---|
| 2020/0281011 | A1* | 9/2020 | Xiong | H04W 72/20 |
| 2021/0160879 | A1* | 5/2021 | Lin | H04W 72/0453 |
| 2021/0219275 | A1* | 7/2021 | Xu | H04L 5/0051 |
| 2023/0078181 | A1* | 3/2023 | Ghanbarinejad | H04W 52/383 |
| | | | | 370/318 |
| 2023/0127731 | A1* | 4/2023 | Yuan | H04L 5/0044 |
| | | | | 370/329 |
| 2023/0137109 | A1* | 5/2023 | Sun | H04W 76/15 |
| | | | | 370/329 |
| 2023/0171763 | A1* | 6/2023 | Gao | H04W 52/08 |
| | | | | 370/329 |
| 2023/0209567 | A1* | 6/2023 | Grossmann | H04L 5/0051 |
| | | | | 370/329 |
| 2023/0262608 | A1* | 8/2023 | Gao | H04W 52/08 |
| | | | | 455/522 |
| 2024/0014870 | A1* | 1/2024 | Ben Hadj Fredj | H04B 7/0639 |
| 2024/0064649 | A1* | 2/2024 | Go | H04W 52/262 |
| 2024/0106614 | A1* | 3/2024 | Gao | H04B 7/022 |
| 2024/0259950 | A1* | 8/2024 | Nilsson | H04W 52/42 |
| 2024/0323976 | A1* | 9/2024 | Gao | H04L 5/0035 |
| 2024/0372661 | A1* | 11/2024 | Park | H04L 5/0044 |

OTHER PUBLICATIONS

Extended European Search Report Issued in Application No. 21933876.1 dated May 3, 2024, 8 pages.

"Enhancements on Multi-TRP for PDCCH, PUCCH and PUSCH", Qualcomm Incorporated, 3GPP TSG-RAN WG1 Meeting #104-e, R1-2101447, e-Meeting, Jan. 25-Feb. 5, 2021, 28 pages.

Office Action issued by the Intellectual Property India on Apr. 28, 2025, in corresponding Application No. IN 202347072874, 7 pages.

* cited by examiner

TRP1                        TRP2

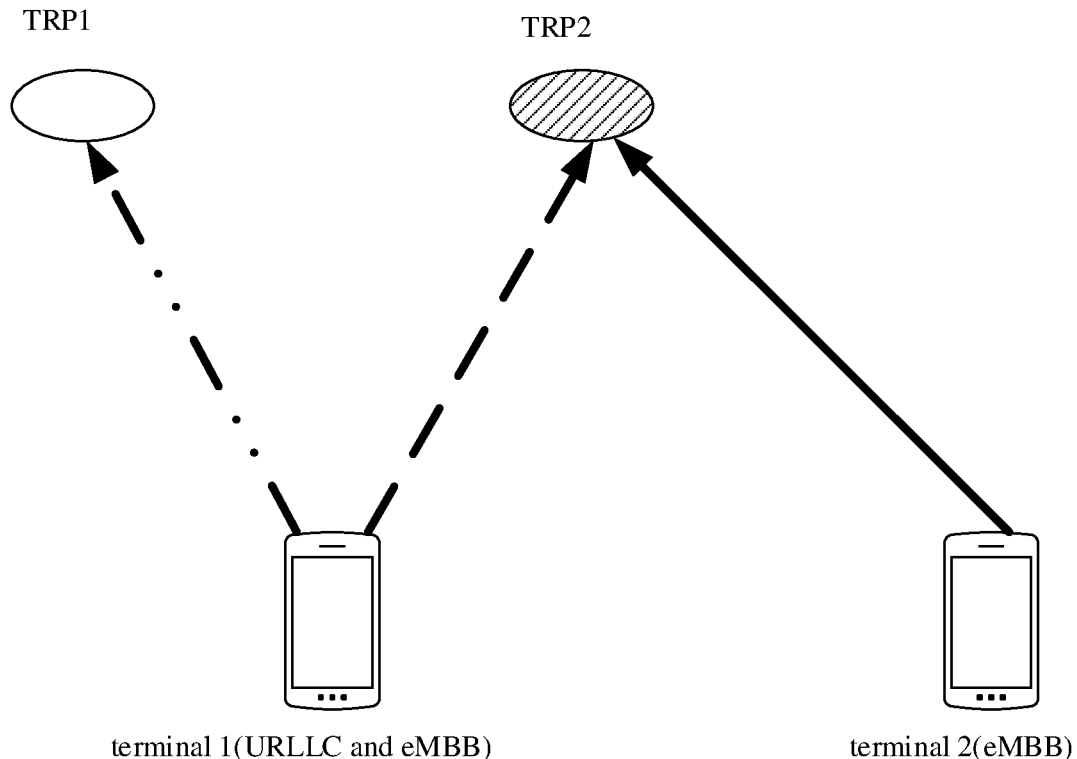

terminal 1(URLLC and eMBB)             terminal 2(eMBB)

FIG. 1

| |
|---|
| configuring and determining open loop power boosting parameters corresponding to one or more transmission reception points (TRPs) |

S11

| |
|---|
| sending indication information, in which the indication information is configured to indicate open loop power boosting parameters for a CG PUSCH configuration adopted by a single TRP independent transmission or a multi-TRP cooperative transmission of a transport block (TB) |

| |
|---|
| configuring and determining open loop power boosting parameters corresponding to one or more transmission reception points (TRPs) based on the RRC configuration information |

| |
|---|
| sending indication information via a group-common (GC)-DCI |

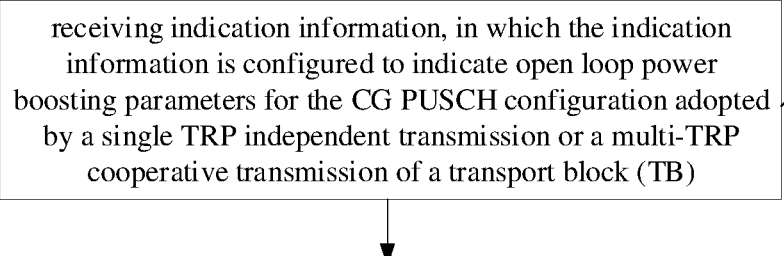

receiving indication information, in which the indication information is configured to indicate open loop power boosting parameters for the CG PUSCH configuration adopted by a single TRP independent transmission or a multi-TRP cooperative transmission of a transport block (TB)          S41 determining the open loop power boosting parameters for the CG PUSCH configuration adopted by the single TRP independent transmission or the multi-TRP cooperative transmission TB based on the configuration information          S42

FIG. 5 receiving indication information via GC-DCI          S51

FIG. 6

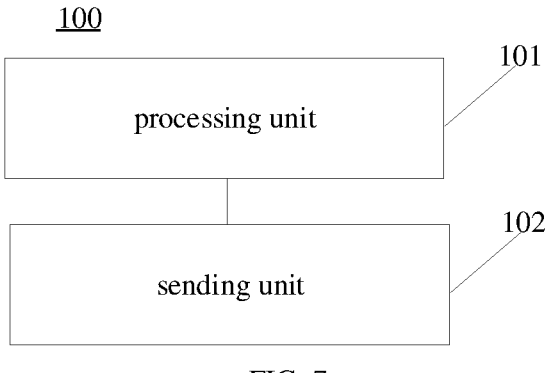

100 processing unit          101 sending unit          102

FIG. 7

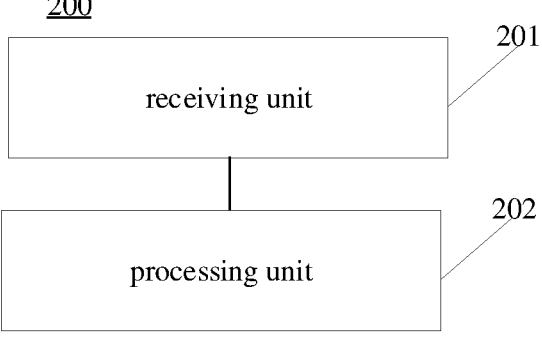

200 receiving unit          201 processing unit          202

FIG. 8

METHOD AND DEVICE FOR OPEN LOOP POWER CONTROL OF UPLINK CG PUSCH, AND STORAGE MEDIUM

CROSS-REFERENCE TO RELATED APPLICATION

This application is the U.S. national application of International Application No. PCT/CN2021/084734, filed on Mar. 31, 2021, the entire contents of which are incorporated herein by reference.

TECHNICAL FIELD

The present disclosure relates to a field of communication technologies, and particularly to a method and an apparatus for open-loop power control of an uplink configured grant PUSCH, and a storage medium.

BACKGROUND

For the multi-TRP/PANEL based PUSCH enhancement in the Release 17, a situation may occur in the PUSCH transmission scenario that a URLLC service sent based on the multi-TRP may conflict with an eMBB service on different TRPs, that is, conflicts and interferences are different for two TRPs on a network device side when receiving. It is a subject to be studied how to enhance a power boosting mechanism of OLPC on a plurality of TRPs.

SUMMARY

According to a first aspect of the present disclosure, a method for open-loop power control of an uplink configured grant (CG) physical uplink shared channel (PUSCH) is provided, and performed by a network device. The method includes:

configuring and determining open loop power boosting parameters corresponding to one or more transmission reception points (TRPs): and sending indication information, in which the indication information is configured to indicate open loop power boosting parameters for a CG PUSCH configuration adopted by a single TRP independent transmission or a multi-TRP cooperative transmission of a transport block (TB).

According to a second aspect of the present disclosure, a method for open-loop power control of an uplink configured grant (CG) physical uplink shared channel (PUSCH) is provided, and performed by a terminal. The method includes:

receiving indication information, in which the indication information is configured to indicate open loop power boosting parameters for a CG PUSCH configuration adopted by a single TRP independent transmission or a multi-TRP cooperative transmission of a transport block (TB); and determining the open loop power boosting parameters for the CG PUSCH configuration adopted by the single TRP independent transmission or the multi-TRP cooperative transmission of the TB.

According to a third aspect of the present disclosure, a terminal includes:

a processor: and a memory for storing instructions executable by the processor;

in which, the processor is configured to: receive indication information, wherein the indication information is configured to indicate open loop power boosting parameters for a CG PUSCH configuration adopted by a single TRP independent transmission or a multi-TRP cooperative transmission of a transport block (TB): and determine the open loop power boosting parameters for the CG PUSCH configuration adopted by the single TRP independent transmission or the multi-TRP cooperative transmission of the TB.

BRIEF DESCRIPTION OF THE DRAWINGS

The drawings herein are incorporated into the specification and constitute a part of the specification, show embodiments in conformity with embodiments of the present disclosure, and explain the principle of the present disclosure together with the specification.

FIG. 1 is a diagram illustrating a wireless communication system according to an embodiment.

FIG. 2 is a flowchart illustrating a method for open-loop power control in of uplink configured grant (CG) physical uplink shared channel (PUSCH) according to an embodiment.

FIG. 3 is a flowchart illustrating a method for open-loop power control of a CG PUSCH according to an embodiment.

FIG. 4 is a flowchart illustrating a method for open-loop power control of a CG PUSCH according to an embodiment.

FIG. 5 is a flowchart illustrating a method for open-loop power control of a CG PUSCH according to an embodiment.

FIG. 6 is a flowchart illustrating a method for open-loop power control of a CG PUSCH configuration according to an embodiment.

FIG. 7 is a block diagram illustrating an apparatus for open-loop power control of a CG PUSCH according to an embodiment.

FIG. 8 is a block diagram illustrating an apparatus for open-loop power control of a CG PUSCH according to an embodiment.

DETAILED DESCRIPTION

Figure 9:
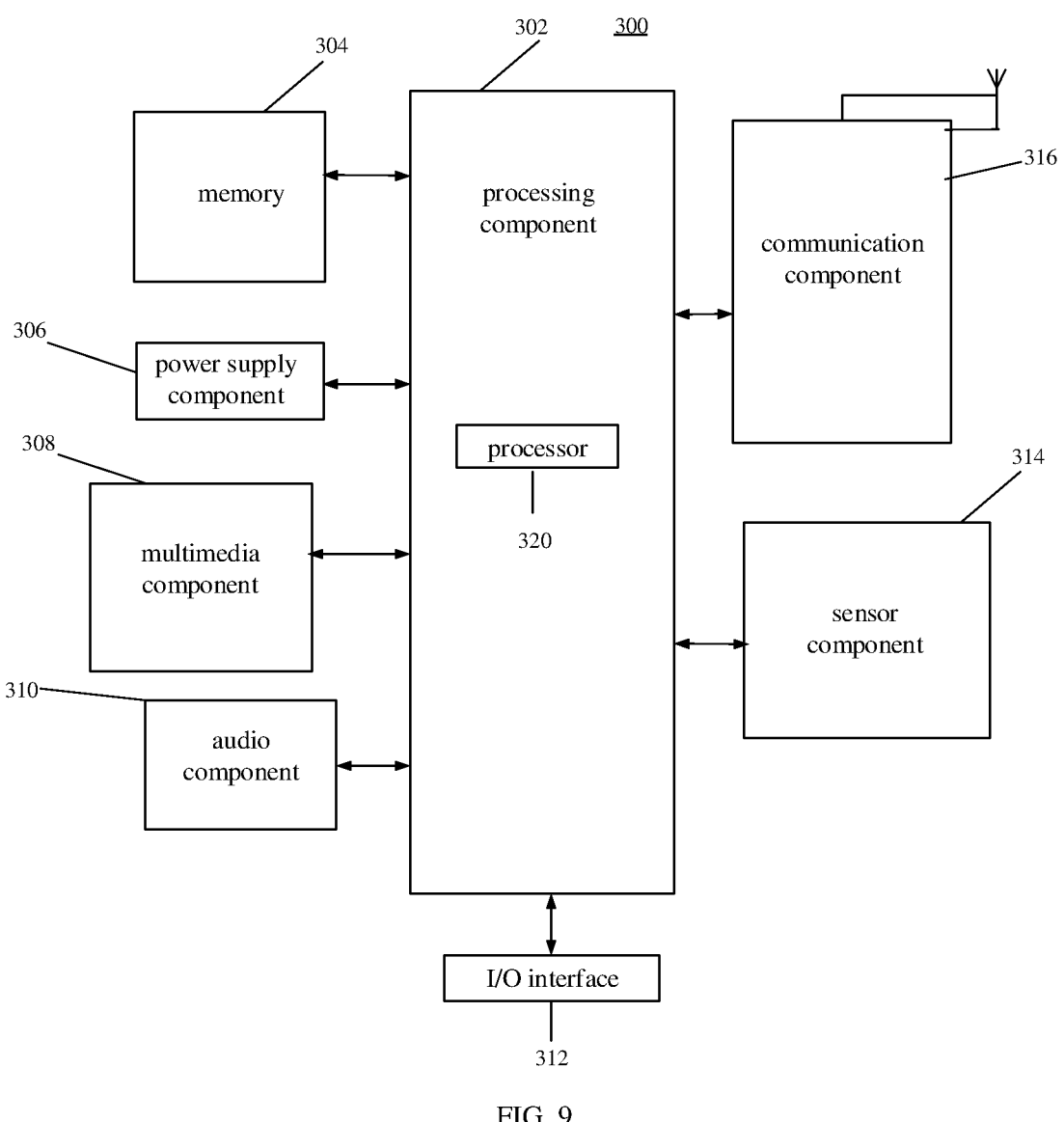
FIG. 9 is a block diagram illustrating a device for open-loop power control of a CG PUSCH according to an embodiment.

The embodiments will be described, of which examples are shown in the accompanying drawings. When the following descriptions refer to the accompanying drawings, same numbers in different drawings represent same or similar elements unless otherwise indicated. The implementations described in the following embodiments do not represent all implementations consistent with the present disclosure. Rather, they are merely examples of apparatuses and methods consistent with some aspects of the disclosure as detailed in the appended claims.

A method for open-loop power control (OLPC) of an uplink configured grant (CG) physical uplink shared channel (PUSCH) in the embodiments of the present disclosure is applicable to a wireless communication system as illustrated in FIG. 1. As illustrated in FIG. 1, the wireless communication system includes a network device and a terminal. The terminal is connected to the network device via a wireless resource, and performs a data transmission. The data transmission between the network device and the terminal is performed based on a beam. Enhancement of PUSCH uplink transmission between the network device and the terminal may be performed based on multi-TRP.

It may be understood that there may be one or more TRPs where the network device performs data transmission with the terminal based on the multi-TRP. The network device performs data transmission with the terminals 1 and 2, respectively based on a TRP1 and a TRP2 in the wireless communication system illustrated in FIG. 1, which is only illustrative and is not limited here.

Further, it may be understood that, the wireless communication system as illustrated in FIG. 1 is only illustrative, and the wireless communication system may further include other network devices, for example, may further include a core network device, a wireless relay device and a wireless backhaul device not shown in FIG. 1. A number of network devices and a number of terminals included in the wireless communication system are not limited in the embodiments of the present disclosure.

It may be further understood that, the wireless communication system in the embodiments of the present disclosure is a network that provides a wireless communication function. The wireless communication system may adopt different communication technologies, for example, code division multiple access (CDMA), wideband code division multiple access (WCDMA), time division multiple access (TDMA), frequency division multiple access (FDMA), orthogonal frequency-division multiple access (OFDMA), single Carrier FDMA (SC-FDMA) and carrier sense multiple access with collision avoidance. The network may be divided into a 2G (generation) network, a 3G network, a 4G network or a future evolution network based on capacities, rates, latencies and other factors of different networks. For example, a 5G network may also be referred to as a new radio (NR) network. For ease of description, the wireless communication network is simply referred to as a network in the disclosure sometimes.

Further, the network device involved in the present disclosure may also be referred to as a wireless access network device. The wireless access network device may be a base station, an evolved base station (i.e., evolved node B), a home base station, an access point (AP) in a wireless fidelity (WiFi) system, a wireless relay node, a wireless backhaul node, a transmission point (TP), or a transmission and reception point (TRP), etc. Alternatively, the wireless access network device may be a gNB in an NR system, or may also be a component or a part of a device constituting a base station. It should be understood that, a specific technology and a specific device form adopted by the network device are not limited in the embodiments of the present disclosure. In the present disclosure, the network device may provide communication coverage for a specific geographic area, and may communicate with a terminal located within the coverage area (cell). In addition, the network device may also be a vehicle-mounted device when the system is an Internet of Vehicles (V2X) communication system.

Further, the terminal involved in the present disclosure may also be referred to as a terminal device, a user equipment (UE), a mobile station (MS), a mobile terminal (MT), etc., which is a device that provides voice and/or data connectivity to a user. For example, the terminal may be a handheld device or a vehicle-mounted device with a wireless connection function, etc. At present, some examples of the terminal are a mobile phone, a customer premise equipment (CPE), a pocket personal computer (PPC), a palm computer, a personal digital assistant (PDA), a notebook computer, a tablet computer, a wearable device, or a vehicle-mounted device. In addition, the terminal device may also be a vehicle-mounted device when the system is an Internet of Vehicles (V2X) communication system. It should be understood that, a specific technology and a specific device form adopted by a terminal are not limited in the embodiments of the present disclosure.

The OLPC may be performed between the network device and the terminal in the disclosure. The Release 16 introduces a OLPC parameter set indication in scheduling DCI to indicate a power boosting indication function for the DG PUSCH, and introduces a new RRC parameter P0-PUSCH-Set to indicate power control, each SRI corresponds to a P0-PUSCH-Set OLPC parameter, which is indicated by a OLPC parameter set indication field.

The network device notifies the terminal of whether there is a OLPC parameter indication field based on a higher layer signaling p0-PUSCH-SetList-r16. When the high layer parameter p0-PUSCH-SetList-r16 is not configured, the OLPC parameter indication field is 0 bit (that is, the OLPC parameter indication field does not exist), and the terminal obtains P0 from a P0-PUSCH-AlphaSet based on the original Rel-15 mechanism. When the high layer parameter p0-PUSCH-SetList-r16 is configured, the OLPC parameter indication field may be configured as 1 bit or 2 bits via the high layer signaling.

1) When there is an SRI indication field in the DCI, the OLPC parameter indication field is configured as 1 bit.

2) When there is no SRI indication field in the DCI, the OLPC parameter indication field may be configured as 1 bit or 2 bits via the high layer signaling.

3) In a scenario where there is an SRI indication field in the DCI, if the OLPC parameter indication field is "0", the Rel-15 mechanism is still used to obtain P0 from the P0-PUSCH-AlphaSet based on the SRI indication. If the open-loop power control parameter indication field is "1", the terminal obtains P0 from the open-loop parameter set P0-PUSCH-Set for boosting power based on the SRI indication.

In a scenario where there is no SRI field in the DCI, the RAN1#99 meeting agreed that, a OLPC indication field in the DCI may be configured as one bit or two bits, and the P0-PUSCH-Set parameter may be configured with two P0 values at most. In the embodiments of the present disclosure, a scenario where the method for OLPC in an uplink CG PUSCH is applied is a scenario where a service conflict occurs in a communication process of the terminal and power control parameters are adjusted. For example, the terminal 1 in FIG. 1 performs a URLLC service and an eMBB service, and the terminal 2 performs an eMBB service. The starting point of the embodiments of the present disclosure is that when the terminal 1 configured with the eMBB service and the URLLC service conflicts with the terminal 2 configured with the eMBB service, the terminal 1 needs three different open loop power levels for boosting powers of the eMBB and the URLLC, which are respectively: 1) a baseline P0 for the eMBB, which is obtained from the P0-PUSCH-AlphaSet: 2) a higher P0, which is configured for power boosting of the URLLC service that does not conflict with the eMBB: and 3) a highest P0, configured in a URLLC PUSCH that conflicts with the eMBB.

In order to describe how the terminal determines P0 based on a high layer parameter and a DCI indication more clearly, it may be shown referring to Table 1. Table 1 shows how the terminal determines P0 based on the high layer parameter and the DCI indication.

5

TABLE 1

| High layer parameter | SRI indication field | OLPC parameter indication field | UE obtains p0 |
|---|---|---|---|
| P0-PUSCH-Set-List is not configured | — | 0 bit | P0 is obtained from the Rel-15 parameter P0-PUSCH-alphaset |
| P0-PUSCH-Set-List is configured | Presence | Only 1 bit is configured, indicating "0" | P0 is obtained from the Rel-15 parameter P0-PUSCH-alphaset |
| | | Only 1 bit is configured, indicating "1" | P0 is obtained from the P0-PUSCH-Set |
| | Absence | 1 bit is configured, indicating "0"; or 2 bits are configured, indicating "00" | P0 is obtained from the Rel-15 parameter P0-PUSCH-alphaset |
| | | 1 bit is configured, indicating "1"; or 2 bits are configured, indicating "01" | the $1^{st}$ value of the P0-PUSCH-Set is taken as P0 |
| | | 2 bits are configured, indicating "10" | the $2^{nd}$ value of a P0-PUSCH-Set is taken as P0 |

In the related art, a data transmission between the network device and the terminal is performed based on a beam. In the Release 17, enhancement of the PUSCH uplink transmission between the network device and the terminal may be performed based on multi-TRP.

In the multi-TRP based PUSCH enhancement solution, a situation may occur in the PUSCH transmission scenario that a URLLC service sent based on the multi-TRP may conflict with the eMBB service on different TRPs. In a CG PUSCH transmission scenario, a situation may also occur that the URLLC service may conflict with the service of the eMBB. Thus, there is a need to consider a corresponding interference control. The CG PUSCH is also referred to as a configured grant PUSCH. The CG PUSCH transmission is different from the DG PUSCH transmission. The network device is incapable of predicting when the terminal transmits the PUSCH, and a plurality of CG PUSCH resources may be configured in a bandwidth part (BWP), and a resource location allocated by each configuration may be not identical, and the CG PUSCH configuration within one BWP may support 12 configurations at most.

In the Release 17, for the multi-TRP based PUSCH enhancement, the main solution is a plurality of retransmissions based on time division multiplexing (TDM). For the CG PUSCH transmission, both a CG PUSCH control transmission corresponding to a single configuration and a CG PUSCH control transmission corresponding to a plurality of configurations may be adopted by cooperative transmission of a same transport block (TB) towards a plurality of TRPs.

When the eMBB service conflicts with the URLLC service, transmission reliability of the URLLC service needs to be preferentially ensured, and Release 16 enhances a dynamic grant (DG) PUSCH, and introduces a power boosting function. No enhancement is performed on the CG PUSCH.

The CG PUSCH is different from the DG PUSCH, and the network device is incapable of predicting when the terminal transmits the PUSCH, and one terminal may be configured with one or more CG PUSCH resources on one BWP. However, there still exists an interference control requirement of processing a service conflict between different terminals. In a multi-TRP transmission scenario, and the conflicts between PUSCHs towards different TRPs and the eMBB service may be not identical, that is, conflicts and interferences are different for two TRPs of the network device when receiving. If a power control adjustment for the CG PUSCH does not distinguish TRP transmissions, the terminal may waste a transmission power, and increase an interference on other UEs, thereby reducing a system performance. Therefore, a power boosting mechanism of OLPC needs to be enhanced.

A method for OLPC of an uplink CG PUSCH is provided in the embodiments of the present disclosure, in which the network device configures and determines open loop power boosting parameters corresponding to one or more TRPs: and sends indication information, to indicate open loop power boosting parameters for the CG PUSCH configuration, the CG PUSCH configuration being adopted by the single TRP independent transmission or the multi-TRP cooperative transmission of the TB. In the present disclosure, the open loop power boosting parameters for the CG PUSCH configuration adopted by the single TRP independent transmission or the multi-TRP cooperative transmission of the TB may be controlled, and an interference control may be thus performed, which ensures the reliability of a communication service.

FIG. 2 is a flowchart illustrating a method for OLPC in an uplink CG PUSCH configuration according to an embodiment. As illustrated in FIG. 2, the method for OLPC in a uplink CG PUSCH configuration includes the following steps.

At step S11, open loop power boosting parameters corresponding to one or more TRPs are configured and determined.

At step S12, indication information is sent. The indication information is configured to indicate open loop power boosting parameters for a CG PUSCH configuration adopted by a single TRP independent transmission or a multi-TRP cooperative transmission of a transport block (TB).

In the method for OLPC in an uplink CGPUSCH configuration in the embodiment of the disclosure, the open loop power boosting parameters for the CG PUSCH configuration adopted by the single TRP independent transmission or the multi-TRP cooperative transmission of the TB may be controlled, and an interference control may be thus performed, which ensures the reliability of a communication service.

In an implementation, in the method for OLPC in an uplink CGPUSCH configuration according to the embodiments of the disclosure, the CG PUSCH configuration includes a CG PUSCH type 1 and a CG PUSCH type 2. The CG PUSCH type 1 may be referred to as a configured grant PUSCH type 1, and the CG PUSCH type 2 may be referred to as a configured grant PUSCH type 2. The configured grant PUSCH type 1 and the configured grant PUSCH type 2 support two CG solutions, and differ in different activation modes.

For the configured grant PUSCH type 1, an uplink grant is provided by an RRC, which includes activation of the grant. Once the terminal correctly receives the RRC configuration, the CG PUSCH configuration takes effect immediately.

For the configured grant PUSCH type 2, a transmission period is provided by the RRC, and the network device achieves resource activation and a configuration of a part of transmission parameters via DCI, thereby achieving an activation transmission of the grant configuration. After the terminal receives an activation command, if there is a data transmission in a cache, the data may be transmitted based on a preconfigured period, and if there is no data, the terminal may not transmit any data. A transmission moment of the PDCCH specifies an activation time. The terminal acknowledges activation/deactivation of the configured grant type 2 by transmitting a medium access control (MAC) signaling on an uplink.

In an implementation, in the method for OLPC in an uplink CG PUSCH configuration according to the embodiments of the disclosure, open loop power boosting parameters corresponding to one or more TRPs may be configured and determined based on RRC configuration information. In the related art, there is no parameter for power boosting in the RRC configuration information. Therefore, the RRC configuration information may be expanded in the embodiments of the disclosure, and open loop power boosting parameters corresponding to one or more TRPs are defined/supported in the RRC configuration information.

FIG. 3 is a flowchart illustrating a method for OLPC in an uplink CG PUSCH configuration according to an embodiment. As illustrated in FIG. 3, the method for OLPC in an uplink CG PUSCH includes the following steps.

At step S21, open loop power boosting parameters corresponding to one or more TRPs are configured and determined based on the RRC configuration information.

The RRC configuration information is configured to indicate respective open loop power boosting parameters for CG PUSCH configurations adopted by transmission of the TB in a single TRP direction or a plurality of different TRP directions.

In the method for OLPC in an uplink CG PUSCH configuration according to the embodiments of the disclosure, a configuration of the open loop power boosting parameters may be performed on each of one or more CG PUSCH configurations. The one or more CG PUSCH configurations may be configured as CG PUSCH configurations adopted by transmission of a same TB in one or more different TRP directions. That is, the RRC configuration information is configured to indicate different open loop power boosting parameters for each of the one or more CG PUSCH configurations. The different open loop power boosting parameters configured in the RRC configuration information are open loop power boosting parameters corresponding to the one or more TRPs.

In the method for OLPC in an uplink CG PUSCH configuration according to the embodiments of the disclosure, when different open loop power boosting parameters are indicated for each of the one or more CG PUSCH configurations, multi-TRP transmission corresponding to a single CG PUSCH configuration may be that, the single CG PUSCH configuration is associated with power control parameters. Mapping to a open loop boosting parameter set is achieved via SRI, and an association mapping to open loop power boosting parameters of different TRPs is achieved based on a pre-defined rule. In an implementation, a single CG PUSCH configuration adopted by the transmission of the TB in the one or more different TRP directions is associated with a power control parameter set via SRI indication information in DCI, and power boosting parameters in the one or more TRP directions are correspondingly obtained. Alternatively, in another implementation, the single CG PUSCH configuration adopted by transmission of the TB in the one or more different TRP directions is associated with power control parameters of different TRPs based on a predefined rule, and power boosting parameters in the one or more TRP directions are correspondingly obtained.

In the method for OLPC in an uplink CG PUSCH configuration according to the embodiments of the present disclosure, the single CG PUSCH configuration may be associated with the power control parameters using at least one way.

In a first way, an association mapping is achieved by an SRI codepoint. When there is an SRI indication field, power control parameters of one or more TRPs are correspondingly associated with the single CG PUSCH configuration via SRI indication information, corresponding to one or more TRPs indicated by an SRI codepoint.

In a second way, an association mapping is achieved by a plurality of SRI indication fields. When there are a plurality of SRI indication fields, power control parameters of one or more TRPs are correspondingly associated with the single CG PUSCH configuration via each SRI indication information corresponding to different TRPs.

In the method for OLPC in an uplink CG PUSCH configuration according to the embodiments of the disclosure, power control parameters may be configured for a plurality of CG PUSCH configurations adopted by transmission of the TB in a plurality of different TRP directions, to achieve configuration of open loop power boosting parameters for each of the plurality of CG PUSCH configurations sent in the plurality of different TRP directions. When different open loop power boosting parameters are indicated for a plurality of the one or more CG PUSCH configurations, multi-TRP transmissions corresponding to the plurality of CG PUSCH configurations may be that, the plurality of CG PUSCH configurations are associated with power control parameters. Association with the power control parameters in the TRP transmission direction is achieved via SRI, or association with power control parameters of the TRP is achieved based on a predefined rule. That is, the plurality of CG PUSCH configurations adopted by transmission of the TB in the plurality of different TRP directions are associated via SRI indication information corresponding to each CG configuration with power control parameters in the TRP transmission direction, or are associated with power control parameters of the TRP based on a predefined rule.

In the method for OLPC in an uplink CG PUSCH configuration according to the embodiments of the disclosure, a plurality of different power control parameter sets may be configured, and the different power control parameter sets are associated with power control parameters of different TRPs. That is, different power control parameter sets are configured, which correspondingly map transmission parameters for different TRPs via different SRI fields.

In the method for OLPC in an uplink CG PUSCH configuration according to the embodiments of the disclosure, for the CG PUSCH configurations adopted by transmission of the TB in a single TRP direction or a plurality of different TRP directions, the RRC configuration information is configured to further indicate respective open loop power boosting parameters.

In an implementation, in embodiments of the disclosure, the open loop power boosting parameters for the CG PUSCH configuration adopted by the single TRP independent transmission or the multi-TRP cooperative transmission of the TB are indicated via DCI.

FIG. 4 is a flowchart illustrating a method for OLPC in an uplink CG PUSCH configuration according to an embodiment. As illustrated in FIG. 4, the method for OLPC in an uplink CG PUSCH configuration includes the following steps.

At step S31, indication information is sent via a group-common (GC)-DCI.

In embodiments of the disclosure, when the indication information is sent via the GC-DC, power boosting parameters for different TRP controls are indicated via the GC-DC.

In the embodiments of the disclosure, when the indication information is sent via the GC-DC, an indication filed in the GC-DCI is configured to directly indicate a plurality of sets of power control parameters corresponding to different TRPs for the CG PUSCH. Specific power control parameters indicated by the indication field in the GC-DCI may be configured by a network or pre-defined. For a single configuration, if the SRI indication field in the activation DCI includes one SRI indication, it indicates a single TRP, and otherwise, it indicates multi-TRP. For a multi-configuration, the activation DCI includes one SRI indication that corresponds to a single TRP.

In embodiments of the disclosure, when power boosting parameters for different TRP controls are indicated via the GC-DC, the network device may respectively indicate open loop power boosting parameters for multi-TRP, sent towards different TRPs and corresponding to the SRI indication, via a related indication field defined in the GC-DC, to indicate CG PUSCHs sent for all configurations acting on the terminal.

For convenience of description, an information field in the DC-DCI, that indicates all CG PUSCH configurations suitable for the terminal and different open loop power boosting parameters corresponding to multi-TRP sent towards different TRPs, is referred to as a first information field. The first information field is configured to indicate different open loop power boosting parameters corresponding to multi-TRP sent towards different TRPs, the multi-TRP sent towards different TRPs is indicated by an SRI indication in DCI. The open loop power boosting parameters are applicable to all CG PUSCH configurations adopted by the multi-TRP cooperative transmission of the TB.

In the embodiments of the disclosure, when the power boosting parameters for different TRP controls are indicated by GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the embodiments of the disclosure, when power boosting parameters for different TRP controls are indicated via the GC-DC, the network device may respectively indicate open loop power boosting parameters for multi-TRP, corresponding to different TRPs indicated by the SRI, via a related indication field for each configuration resource defined in the GC-DC. The indication only acts on a corresponding CG PUSCH configuration indicated by a base station.

For convenience of description, an information field in the DC-DCI, that indicates CG PUSCH configurations indicated by the network device and different open loop power boosting parameters corresponding to multi-TRP sent towards different TRPs, is referred to as a second information field. The second information field is configured to indicate PUSCH open loop power boosting parameters in different TRP transmission directions in SRI indication information corresponding to one or more CG PUSCH configurations, or configured to indicate open loop power boosting parameters in different TRP transmission directions corresponding to all CG PUSCH configurations. The open loop power boosting parameters are applicable to a single CG PUSCH configuration. The single CG PUSCH configuration may be a CG PUSCH configuration indicated by the network device.

In the embodiments of the disclosure, when the power boosting parameters of different TRP controls are indicated by GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the embodiments of the disclosure, the GC-DCI may be configured to indicate parameters only for one or more configurations that need to be boosted, or may also be configured to indicate parameters for all the scheduled configurations set by the terminal. Those that do not need to be boosted are set to be invalid. The method may correspond to different GC-DCI designs.

In the method for OLPC in an uplink CG PUSCH configuration according to the embodiments of the present disclosure, the network device may indicate a time-frequency resource location where a time-frequency resource conflict occurs between the terminal and other users in the GC-DCI, for example, a time-frequency resource location of an eMBB where a conflict may occur between the terminal and other users. The terminal determines whether to be affected by the time-frequency resource conflict based on the indication information sent by the network device. If it is determined that the terminal is affected by the time-frequency resource conflict, the terminal performs a power boosting operation of different TRPs.

In the method for OLPC in an uplink CG PUSCH configuration according to the embodiments of the present disclosure, for configuration of the uplink CG PUSCH, power boosting of OLPC respectively on different TRPs may be achieved based on a design enhancement in a high layer signaling and a DCI command, which may solve an interference control when the URLLC service conflicts with the eMBB service, and ensures high reliability of the URLLC service.

In the method for OLPC in an uplink CG PUSCH configuration according to the embodiments of the present disclosure, the single CG PUSCH configuration may be associated with the power control parameters by: achieving an association mapping via an SRI codepoint. When there is an SRI indication field, power control parameters of one or more TRPs are correspondingly associated with the single CG PUSCH configuration, via SRI indication information corresponding to one or more TRPs indicated by an SRI codepoint. When power boosting parameters for different TRP controls are indicated via the GC-DC, the network device may respectively indicate open loop power boosting parameters for multi-TRP, sent towards different TRPs and corresponding to the SRI indication, via a related indication field defined in the GC-DC, to indicate CG PUSCHs sent by all configurations acting on the terminal. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters by: achieving an association mapping via a plurality of SRI indication fields. When there are a plurality of SRI indication fields, power control parameters of one or more TRPs are correspondingly associated with the single CG PUSCH configuration via each SRI indication information corresponding to different TRPs. When power boosting parameters for different TRP controls are indicated via the GC-DC, the network device may respectively indicate open loop power boosting parameters for multi-TRP, sent towards different TRPs and corresponding to the SRI indication, via a related indication field defined in the GC-DC, to indicate CG PUSCHs sent by all configurations acting on the terminal. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there are no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters using the following way: in the method for OLPC in an uplink CG PUSCH configuration, a plurality of different power control parameter sets may be configured, and the plurality of different power control parameter sets are associated with power control parameters of different TRPs. That is, different power control parameter sets are configured, which correspondingly map transmission parameters of different TRPs via different SRI fields. When power boosting parameters for different TRP controls are indicated via the GC-DC, the network device may respectively indicate open loop power boosting parameters for multi-TRP, sent towards different TRPs and corresponding to the SRI indication, via a related indication field defined in the GC-DC, to indicate CG PUSCHs sent by all configurations acting on the terminal. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters by achieving an association mapping via an SRI codepoint. When there is an SRI indication field, power control parameters of one or more TRPs are correspondingly associated with the single CG PUSCH configuration, via SRI indication information corresponding to one or more TRPs indicated by an SRI codepoint. When power boosting parameters for different TRP controls are indicated via the GC-DCI, the network device may respectively indicate open loop power boosting parameters for multi-TRP, corresponding to different TRPs indicated by the SRI, via a related indication field for each configuration resource defined in the GC-DCI. The indication only acts on a corresponding CG PUSCH configuration indicated by a base station. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters by achieving an association mapping via a plurality of SRI indication fields. When there are a plurality of SRI indication fields, power control parameters of one or more TRPs are correspondingly associated with the single CG PUSCH configuration via each SRI indication information corresponding to different TRPs. When power boosting parameters for different TRP controls are indicated via the GC-DCI, the network device may respectively indicate open loop power boosting parameters for multi-TRP, corresponding to different TRPs indicated by the SRI, via a related indication field for each configuration resource defined in the GC-DCI. The indication only acts on a corresponding CG PUSCH configuration indicated by a base station. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters using the following way: in the method for OLPC in an uplink CG PUSCH configuration, a plurality of different power control parameter sets may be configured, and the plurality of different power control parameter sets are associated with power control parameters of different TRPs. That is, different power control parameter sets are configured, which correspondingly map transmission parameters for different TRPs via different SRI fields. When power boosting parameters for different TRP controls are indicated via the GC-DC, the network device may respectively indicate open loop power boosting parameters for multi-TRP, corresponding to different TRPs indicated by the SRI, via a related indication field for each configuration resource defined in the GC-DC. The indication only acts on a corresponding CG PUSCH configuration indicated by a base station. When power boosting parameters of different TRP controls are indicated by the GC-DCI, if there is no SRI indication field in the DCI, the open loop power boosting parameters of a multi-TRP sent towards different TRPs have a pre-defined association indication relationship with the CG PUSCH configuration. In an example, if there is no an SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the single CG PUSCH configuration may be associated with the power control parameters by achieving an association mapping via an SRI codepoint. When there is an SRI indication field, power control parameters of one or more TRPs are correspondingly associated with the single CG PUSCH configuration via SRI indication information corresponding to one or more TRPs indicated by an SRI codepoint. The network device may indicate a time-frequency resource location where a time-frequency resource conflict occurs between the terminal and other users in the GC-DCI, for example, a time-frequency resource location of an eMBB where a conflict may occur between the terminal and other users. The terminal determines whether to be affected by the time-frequency resource conflict based on the indication information sent by the network device. If it is determined that the terminal is affected by the time-frequency resource conflict, the terminal performs a power boosting operation of different TRPs.

In the method for OLPC in an uplink CG PUSCH configuration according to the embodiments of the present disclosure, the single CG PUSCH configuration may be associated with the power control parameters by achieving an association mapping via a plurality of SRI indication fields. When there are a plurality of SRI indication fields, power control parameters of one or more TRPs are correspondingly associated with the single CG PUSCH configuration via each SRI indication information corresponding to different TRPs. The network device may indicate a time-frequency resource location where a time-frequency resource conflict occurs between the terminal and other users in the GC-DCI, for example, a time-frequency resource location of an eMBB where a conflict may occur between the terminal and other users. The terminal determines whether to be affected by the time-frequency resource conflict based on the indication information sent by the network device. If it is determined that the terminal is affected by the time-frequency resource conflict, the terminal performs a power boosting operation of different TRPs.

In the method for OLPC in an uplink CG PUSCH configuration according to the embodiments of the present disclosure, the single CG PUSCH configuration may be associated with the power control parameters using the following way: in the method for OLPC in an uplink CG PUSCH configuration, a plurality of different power control parameter sets may be configured, and the plurality of different power control parameter sets are associated with power control parameters of different TRPs. That is, different power control parameter sets are configured, which correspondingly map transmission parameters for different TRPs via different SRI fields. The network device may indicate a time-frequency resource location where a time-frequency resource conflict occurs between the terminal and other users in the GC-DCI, for example, a time-frequency resource location of an eMBB where a conflict may occur between the terminal and other users. The terminal determines whether to be affected by the time-frequency resource conflict based on the indication information sent by the network device. If it is determined that the terminal is affected by the time-frequency resource conflict, the terminal performs a power boosting operation of different TRPs.

Based on the same concept, a method for OLPC in an uplink CG PUSCH configuration is further provided in the embodiments of the disclosure. The method for OLPC in an uplink CG PUSCH configuration may be performed by a terminal.

FIG. 5 is a flowchart illustrating a method for OLPC in an uplink CG PUSCH configuration according to an embodiment. As illustrated in FIG. 5, the method for OLPC in an uplink CG PUSCH configuration includes the following steps.

At step S41, indication information is received. The indication information is configured to indicate open loop power boosting parameters for a CG PUSCH configuration adopted by a single TRP independent transmission or a multi-TRP cooperative transmission of a transport block (TB).

At step S42, the open loop power boosting parameters for the CG PUSCH configuration adopted by the single TRP independent transmission or the multi-TRP cooperative transmission TB are determined based on the indication information.

In an implementation, the CG PUSCH configuration includes a CG PUSCH type 1 and a CG PUSCH type 2. For the CG PUSCH type 1, an uplink grant is provided by an RRC, which includes activation of a grant. Once the terminal correctly receives an RRC configuration, a CG PUSCH configuration takes effect immediately. For the CG PUSCH type 2, a transmission period is provided by the RRC, and the network device achieves resource activation and a configuration of a part of transmission parameters via DCI, thereby achieving an activation transmission of the grant configuration. After the terminal receives an activation command, if there is a data transmission in a cache, the data may be transmitted based on a preconfigured period, and if there is no data, the terminal may not transmit any data. A transmission moment of the PDCCH specifies an activation time. The terminal acknowledges activation/deactivation of the CG PUSCH type 2 by transmitting a medium access control (MAC) signaling on an uplink.

In an implementation, open loop power boosting parameters are determined based on open loop power boosting parameters corresponding to the one or more TRPs. The open loop power boosting parameters corresponding to the one or more TRPs for determining open loop power boosting parameters are configured based on the RRC configuration information. The RRC configuration information is configured to indicate respective open loop power boosting parameters for CG PUSCH configurations adopted by transmission of the TB in a single TRP direction or a plurality of different TRP directions.

In an implementation, the RRC configuration information is configured to indicate different open loop power boosting parameters for each of one or more CG PUSCH configurations, the different open loop power boosting parameters are open loop power boosting parameters corresponding to the one or more TRPs, and the one or more CG PUSCH configurations are CG PUSCH configurations adopted by transmission of a same TB in one or more different TRP directions.

In the method for OLPC in an uplink CG PUSCH configuration according to the embodiments of the present disclosure, a single CG PUSCH configuration adopted by the transmission of the TB in the one or more different TRP directions is associated with a power control parameter set via sounding reference signal resource indication (SRI) indication information in downlink control information (DCI), and power boosting parameters in the one or more TRP directions are correspondingly obtained. Alternatively, a single CG PUSCH configuration adopted by transmission of the TB in the one or more different TRP directions is associated with power control parameters of different TRPs based on a predefined rule, and power boosting parameters in the one or more TRP directions are correspondingly obtained.

In an implementation, in the method for OLPC in an uplink CG PUSCH configuration according to the embodiments of the present disclosure, the single CG PUSCH configuration may be associated with the power control parameters using at least one way.

In a first way, an association mapping is achieved by an SRI codepoint. When there is an SRI indication field, power control parameters of one or more TRPs are correspondingly associated with the single CG PUSCH configuration via SRI indication information corresponding to one or more TRPs indicated by an SRI codepoint.

In a second way, an association mapping is achieved by a plurality of SRI indication fields. When there are a plurality of SRI indication fields, power control parameters of one or more TRPs are correspondingly associated with the single CG PUSCH configuration via each SRI indication information corresponding to different TRPs.

In the method for OLPC in an uplink CG PUSCH configuration according to the embodiments of the disclosure, the CG PUSCH configurations adopted by transmission of the TB in the different TRP directions are associated via SRI indication information corresponding to each CG configuration with power control parameters in the TRP transmission direction, or are associated with power control parameters of the TRP based on a predefined rule.

In the method for OLPC in an uplink CG PUSCH configuration according to the embodiments of the disclosure, the RRC configuration information configures a plurality of different power control parameter sets, and the plurality of different power control parameter sets are associated with power control parameters of different TRPs. That is, a plurality of different power control parameter sets are configured, and the plurality of different power control parameter sets are associated with power control parameters of different TRPs. That is, different power control parameter sets are configured, which correspondingly map transmission parameters for different TRPs via different SRI fields.

In an implementation, the embodiments of the disclosure may determine the open loop power boosting parameters for the CG PUSCH configuration adopted by the single TRP independent transmission or the multi-TRP cooperative transmission of the TB via DCI.

FIG. 6 is a flowchart illustrating a method for OLPC in an uplink CG PUSCH configuration according to an embodiment. As illustrated in FIG. 6, the method for OLPC in an uplink CG PUSCH configuration includes the following steps.

At step S51, indication information is received via GC-DCI.

In the embodiments of the disclosure, the indication information is received via the GC-DCI. An indication filed in the GC-DCI is configured to directly indicate a plurality of power control parameter sets corresponding to different TRPs for the CG PUSCH.

In an implementation, in response to the GC-DCI including a first information field, the first information field is configured to indicate different open loop power boosting parameters corresponding to multi-TRP sent towards different TRPs, the multi-TRP sent towards different TRPs is indicated by an SRI indication in DCI, and the open loop power boosting parameters are applicable to all CG PUSCH configurations adopted by the multi-TRP cooperative transmission of the TB. In another implementation, in response to the GC-DCI including a second information field, the second information field is configured to indicate open loop power boosting parameters in different TRP transmission directions in SRI indication information corresponding to one or more CG PUSCH configurations, or configured to indicate open loop power boosting parameters in different TRP transmission directions corresponding to all CG PUSCH configurations: and the open loop power boosting parameters are applicable to a single CG PUSCH configuration.

In an implementation, when the power boosting parameters of different TRP controls are indicated by GC-DCI, if there is no SRI indication field in the DCI, the open loop power boosting parameters of a multi-TRP sent towards different TRPs have a pre-defined association indication relationship with the CG PUSCH configuration. In an example, if there is no SRI indication field in the DCI, a default value in a list used may be pre-defined, for example, a first P0 value in a list of P0 power parameters indicated by a corresponding TRP is used.

In the method for OLPC in an uplink CG PUSCH configuration according to the embodiments of the present disclosure, the terminal may receive indication information configured to indicate a time-frequency resource location where a time-frequency resource conflict occurs between the terminal and other users. The terminal determines the time-frequency resource location where a time-frequency resource conflict occurs between the terminal and other users based on the indication information, and the terminal determines whether to be affected by the time-frequency resource conflict. If it is determined that the terminal is affected by the time-frequency resource conflict, the terminal performs a power boosting operation of different TRPs.

In an implementation, the GC-DCI may be configured to indicate a time-frequency resource location where a time-frequency resource conflict occurs between the terminal and other users. The terminal determines the time-frequency resource location where a time-frequency resource conflict occurs between the terminal and other users based on the received GC-DCI, and the terminal determines whether to be affected by the time-frequency resource conflict. If it is determined that the terminal is affected by the time-frequency resource conflict, the terminal performs a power boosting operation of different TRPs.

It may be understood that, the method for OLPC in an uplink CG PUSCH configuration executed by the terminal in the embodiments of the disclosure is similar with the method for OLPC in an uplink CG PUSCH configuration executed by a network device. Therefore, the description not detailed in the method for OLPC in an uplink CG PUSCH configuration executed by the terminal in the embodiments of the disclosure may refer to the method for OLPC in an uplink CG PUSCH configuration executed by the network device as described in the above embodiments.

It may be further understood that, the method for OLPC in an uplink CG PUSCH configuration according to the embodiments of the disclosure may be applied to an implementation process that interaction between the terminal and the network device achieves open-loop power control of an uplink CG PUSCH. In the process that interaction between the terminal and the network device achieves open-loop power control of the uplink CG PUSCH, the network device and the terminal respectively execute related functions involved in the above embodiments, which will not be described here.

It needs to be noted that, those skilled in the art may understand that various implementations/embodiments involved in the embodiments of the present disclosure may be used in combination with the above embodiments, or may be independently used. Whether independently used or used in combination with the above embodiments, the implementation principle is similar. In the embodiments of the present disclosure, a part of embodiments are illustrated by the implementations used together. It may be understood by those skilled in the art that the examples are not a limitation of embodiments of the present disclosure.

Based on the same conception, an apparatus for OLPC in an uplink CG PUSCH configuration is further provided in the embodiments of the present disclosure.

It may be understood that, the apparatus for OLPC in an uplink CG PUSCH configuration according to the embodiments of the present disclosure includes hardware structures and/or software modules that perform corresponding functions in order to achieve the above functions. In combination with modules and algorithm steps of examples described in the embodiments of the present disclosure, the embodiments of the present disclosure may be implemented in the form of a hardware or a combination of a hardware and a computer software. Whether a certain function is executed by a hardware or a computer software driving a hardware depends on specific applications and design constraints of the technical solution. Those skilled in the art may adopt different methods for each specific application to implement the described functions, but such implementation should not be considered as going beyond the scope of the technical solutions in the embodiments of the present disclosure.

FIG. 7 is a block diagram illustrating an apparatus for OLPC in an uplink CG PUSCH configuration according to an embodiment. As illustrated in FIG. 7, the apparatus for OLPC in an uplink CG PUSCH configuration includes a processing unit 101 and a sending unit 102.

The processing unit 101 configures and determines open loop power boosting parameters corresponding to one or more TRPs. The sending unit 102 is configured to send indication information. The indication information is configured to indicate open loop power boosting parameters for a CG PUSCH configuration adopted by a single TRP independent transmission or a multi-TRP cooperative transmission of a TB.

In an implementation, the CG PUSCH configuration includes a CG PUSCH type 1 and a CG PUSCH type 2.

In an implementation, the processing unit 101 configures and determines the open loop power boosting parameters corresponding to one or more TRPs based on RRC configuration information. The RRC configuration information is configured to indicate respective open loop power boosting parameters for CG PUSCH configurations adopted by transmission of the TB in a single TRP direction or a plurality of different TRP directions.

In an implementation, the RRC configuration information is configured to indicate different open loop power boosting parameters for each of one or more CG PUSCH configurations, the different open loop power boosting parameters are the open loop power boosting parameters corresponding to the one or more TRPs, and the one or more CG PUSCH configurations are CG PUSCH configurations adopted by transmission of a same TB in one or more different TRP directions.

In an implementation, a single CG PUSCH configuration adopted by the transmission of the TB in the one or more different TRP directions is associated with a power control parameter set via SRI indication information in DCI, and power boosting parameters in the one or more TRP directions are correspondingly obtained, or, a single CG PUSCH configuration adopted by transmission of the TB in the one or more different TRP directions is associated with power control parameters of different TRPs based on a predefined rule, and power boosting parameters in the one or more TRP directions are correspondingly obtained.

In an implementation, the processing unit 101 associates the single CG PUSCH configuration with the power control parameters 101 using at least one way of:

in the presence of an SRI indication field, correspondingly associating power control parameters of one or more TRPs with the single CG PUSCH configuration via SRI indication information corresponding to one or more TRPs indicated by an SRI codepoint: or in the presence of a plurality of SRI indication fields, correspondingly associating power control parameters of one or more TRPs with the single CG PUSCH configuration via each SRI indication information corresponding to different TRPs.

In an implementation, a plurality of CG PUSCH configurations adopted by transmission of the TB in a plurality of different TRP directions are associated with power control parameters in the TRP transmission direction via SRI indication information corresponding to each CG configuration, or are associated with power control parameters of the TRP based on a predefined rule.

In an implementation, the RRC configuration information configures a plurality of different power control parameter sets, and the plurality of different power control parameter sets are associated with power control parameters of different TRPs.

In an implementation, the sending unit 102 sends the indication information via group-common downlink control information (GC-DCI).

In an implementation, in response to the GC-DCI including a first information field, the first information field is configured to indicate different open loop power boosting parameters corresponding to multi-TRP sent towards different TRPs, the multi-TRP sent towards different TRPs is indicated by an SRI indication in DCI, and the open loop power boosting parameters are applicable to all CG PUSCH configurations adopted by the multi-TRP cooperative transmission of the TB.

In an implementation, in response to the GC-DCI including a second information field, the second information field is configured to indicate open loop power boosting parameters in different TRP transmission directions in SRI indication information corresponding to one or more CG PUSCH configurations, or configured to indicate open loop power boosting parameters in different TRP transmission directions corresponding to all CG PUSCH configurations: and the open loop power boosting parameters are applicable to a single CG PUSCH configuration.

In an implementation, in response to the absence of an SRI indication field in the DCI, the open loop power boosting parameters of a multi-TRP sent towards different TRPs have a pre-defined association indication relationship with the CG PUSCH configuration.

In an implementation, the GC-DCI is configured to indicate a time-frequency resource location where a time-frequency resource conflict occurs between the terminal and other users.

FIG. 8 is a block diagram illustrating an apparatus for OLPC in an uplink CG PUSCH configuration according to an embodiment. As illustrated in FIG. 8, the apparatus for OLPC in an uplink CG PUSCH configuration includes a receiving unit 201 and a processing unit 202.

The receiving unit 201 is configured to receive indication information for indicating open loop power boosting parameters of a CG PUSCH configuration adopted by a single TRP independent transmission or a multi-TRP cooperative transmission of a TB. The processing unit 202 is configured to determine the open loop power boosting parameters for the CG PUSCH configuration adopted by the single TRP independent transmission or the multi-TRP cooperative transmission TB.

In an implementation, the CG PUSCH configuration includes a CG PUSCH type 1 and a CG PUSCH type 2.

In an implementation, the open loop power boosting parameters corresponding to the one or more TRPs are configured based on RRC configuration information. The RRC configuration information is configured to indicate respective open loop power boosting parameters for CG PUSCH configurations adopted by transmission of the TB in a single TRP direction or a plurality of different TRP directions.

In an implementation, the RRC configuration information is configured to indicate different open loop power boosting parameters for each of one or more CG PUSCH configurations, the different open loop power boosting parameters are the open loop power boosting parameters corresponding to the one or more TRPs, and the one or more CG PUSCH configurations are CG PUSCH configurations adopted by transmission of a same TB in one or more different TRP directions.

In an implementation, a single CG PUSCH configuration adopted by the transmission of the TB in the one or more different TRP directions is associated with a power control parameter set via SRI indication information in DCI, and power boosting parameters in the one or more TRP directions are correspondingly obtained, or, a single CG PUSCH configuration adopted by transmission of the TB in the one or more different TRP directions is associated with power control parameters of different TRPs based on a predefined rule, and power boosting parameters in the one or more TRP directions are correspondingly obtained.

In an implementation, the single CG PUSCH configuration is associated with the power control parameters using at least one way of: in the presence of an SRI indication field, power control parameters of one or more TRPs are correspondingly associated with the single CG PUSCH configuration via SRI indication information corresponding to one or more TRPs indicated by an SRI codepoint: or in the presence of a plurality of SRI indication fields, power control parameters of one or more TRPs are correspondingly associated with the single CG PUSCH configuration via each SRI indication information corresponding to different TRPs.

In an implementation, a plurality of CG PUSCH configurations adopted by transmission of the TB in a plurality of different TRP directions are associated with power control parameters in the TRP transmission direction via SRI indication information corresponding to each CG configuration, or are associated with power control parameters of the TRP based on a predefined rule.

In an implementation, the RRC configuration information configures a plurality of different power control parameter sets, and the plurality of different power control parameter sets are associated with power control parameters of different TRPs.

In an implementation, the receiving unit 201 receives the indication information via group-common downlink control information (GC-DCI).

In an implementation, in response to the GC-DCI including a first information field, the first information field is configured to indicate different open loop power boosting parameters corresponding to multi-TRP sent towards different TRPs, the multi-TRP sent towards different TRPs is indicated by an SRI indication in DCI, and the open loop power boosting parameters are applicable to all CG PUSCH configurations adopted by the multi-TRP cooperative transmission of the TB.

In an implementation, in response to the GC-DCI including a second information field, the second information field is configured to indicate open loop power boosting parameters in different TRP transmission directions in SRI indication information corresponding to one or more CG PUSCH configurations, or configured to indicate open loop power boosting parameters in different TRP transmission directions corresponding to all CG PUSCH configurations: and The open loop power boosting parameters are applicable to a single CG PUSCH configuration.

In an implementation, in response to the absence of an SRI indication field in the DCI, the open loop power boosting parameters of a multi-TRP sent towards different TRPs have a pre-defined association indication relationship with the CG PUSCH configuration.

In an implementation, the GC-DCI is configured to indicate a time-frequency resource location where a time-frequency resource conflict occurs between the terminal and other users.

With regard to the apparatus in the above embodiments, the specific way in which each module performs the operation has been described in the embodiments of the method and will not be elaborated here.

FIG. 9 is a block diagram illustrating a device for OLPC in an uplink CG PUSCH configuration according to an embodiment. For example, the device 300 may be a mobile phone, a computer, a digital broadcasting terminal, a messaging device, a game console, a tablet device, a medical equipment, a fitness equipment, a personal digital assistant, etc.

As illustrated in FIG. 9, the device 300 may include one or more components: a processing component 302, a memory 304, a power supply component 306, a multimedia component 308, an audio component 310, an input/output (I/O) interface 312, a sensor component 314, and a communication component 316.

The processing component 302 generally controls the whole operations of the device 300, such as operations related to display, phone call, data communication, camera operation and recording operation. The processing component 302 may include one or more processors 320 to perform instructions, to complete all or part of steps of the above method. In addition, the processing component 302 may include one or more modules for the convenience of interaction between the processing component 302 and other components. For example, the processing component 302 may include a multimedia module for the convenience of interactions between the multimedia component 308 and the processing component 302.

The memory 304 is configured to store all types of data to support the operation of the device 300. Examples of the data include the instructions of any applications or methods operated on the device 300, contact data, phone book data, messages, pictures, videos, etc. The memory 304 may be implemented by any type of volatile or non-volatile storage devices or their combination, such as a static random access memory (SRAM), an electrically erasable programmable read-only memory (EEPROM), an erasable programmable read-only memory (EPROM), a programmable read-only memory (PROM), a read-only memory (ROM), a magnetic memory, a flash memory, a magnetic disk or an optical disk.

The power supply component 306 may provide power supply for all components of the device 300. The power supply component 306 may include a power supply management system, one or more power supplies, and other units related to generating, managing and distributing power for the device 300.

The multimedia component 308 includes an output interface screen provided between the device 300 and the user. In some embodiments, the screen may include a liquid crystal display (LCD) and a touch panel (TP). When the screen includes a touch panel, the screen may be implemented as a touch screen to receive input signals from the user. The touch panel includes one or more touch sensors to sense touch, slide and gestures on the touch panel. The touch sensor may not only sense the boundary of touch or slide action, but also detect the duration and pressure related to the touch or slide operation. In some embodiments, the multimedia component 308 includes a front camera and/or a rear camera. When the device 300 is in an operation mode, such as a shooting mode or a video mode, the front camera or the rear camera may receive external multimedia data. Each of the front camera and the rear camera may be a fixed optical lens system or an optical lens system with a focal length and an optical zoom capacity.

The audio component 310 is configured as an output and/or input signal. For example, the audio component 310 includes a microphone (MIC). When the device 300 is in the operation mode, such as a call mode, a record mode, and a speech recognition mode, the microphone is configured to receive external audio signals. The audio signals received may be further stored in the memory 304 or sent via the communication component 316. In some embodiments, the audio component 310 further includes a speaker configured to output an audio signal.

The I/O interface 312 provides an interface for the processing component 302 and the peripheral interface module, and the peripheral interface module may be a keyboard, a click wheel, a button, etc. The buttons may include but not limited to a home button, a volume button, a start button and a lock button.

The sensor component 314 includes one or more sensors, configured to provide various aspects of status assessment for the device 300. For example, the sensor component 314 may detect an on/off state of the device 300 and a relative positioning of the component. For example, the component is a display and a keypad of the device 300. The sensor component 314 may further detect a location change of the device 300 or one component of the device 300, a presence or absence of contacts between the user and the device 300, an orientation or acceleration/deceleration of the device 300, and a temperature change of the device 300. The sensor component 314 may include a proximity sensor, which is configured to detect the existence of the objects nearby without any physical contact. The sensor component 314 may further include a light sensor such as CMOS or CCD image sensor, which is configured to use in imaging applications. In some embodiments, the sensor component 314 may further include an acceleration transducer, a gyroscope sensor, a magnetic sensor, a pressure sensor or a temperature sensor.

The communication component 316 is configured for the convenience of wire or wireless communication between the device 300 and other devices. The device 300 may access wireless networks based on communication standard, such as WiFi, 2G or 3G, or their combination. In an embodiment, the communication component 316 receives broadcast signals or broadcast-related information from an external broadcast management system via a broadcast channel. In an embodiment, the communication component 316 further includes a near field communication (NFC) module to facilitate short-range communication. For example, an NFC module may be implemented based on a radio frequency identification (RFID) technology, an infrared data association (IRDA) technology, an ultra-wideband (UWB) technology, bluetooth (BT) technology and other technologies.

In an embodiment, the device 300 may be implemented by one or more application specific integrated circuits (ASICs), digital signal processors (DSPs), digital signal processing devices (DSPDs), programmable logic devices (PLDs), field programmable gate arrays (FPGAs), controllers, micro control units (MCUs), microprocessors or other electronics components, which is configured to perform the above method.

In an embodiment, a non-transitory computer readable storage medium is further provided which includes instructions, such as the memory 304 including instructions. The instructions may be executed by the processor 320 of the device 300 to complete the above methods. For example, the non-transitory computer-readable storage medium may be a ROM, a random access memory (RAM), a CD-ROM, a magnetic tape, a floppy disk, an optical data storage device, etc.

Figure 10:
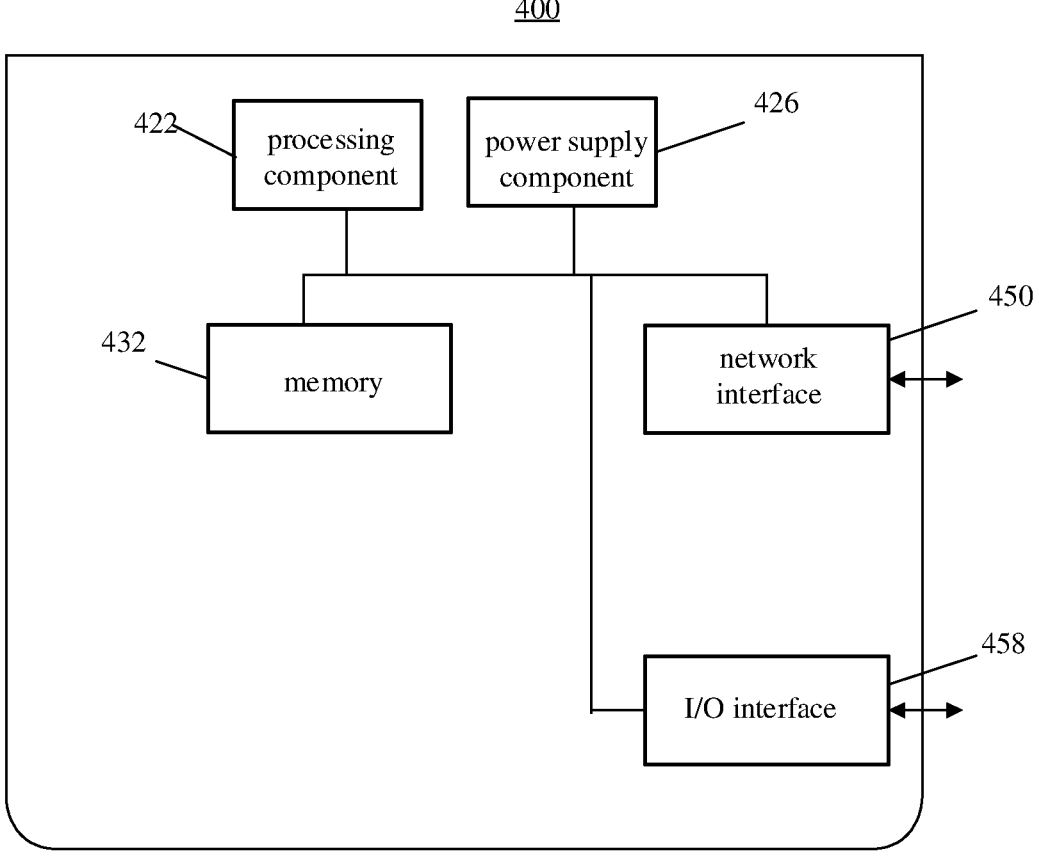
FIG. 10 is a block diagram illustrating a device for open-loop power control of a CG PUSCH according to an embodiment.

FIG. 10 is a block diagram illustrating a device for OLPC in an uplink CG PUSCH configuration according to an embodiment. For example, the device 400 may be provided as a network device. As illustrated in FIG. 10, the device 400 includes a processing component 422, which further includes one or more processors, and memory resources represented by a memory 432, which are configured to store instructions executable by the processing component 422, for example, an application. The application stored in the memory 432 may include one or more modules each of which corresponds to a set of instructions. In addition, the processing component 422 is configured to execute instructions, to perform the above method.

The device 400 may further include one power supply component 426 configured to execute power management of the device 400, and one wired or wireless network interface 450 configured to connect the device 400 to a network, and one input/output (I/O) interface 458. The device 400 may operate an operating system stored in the memory 432, for example, Windows Server™, Mac OS X™, Unix™, Linux™, FreeBSD™.

In an embodiment, a non-transitory computer-readable storage medium including instructions is further provided, for example, the memory 432 including instructions. The instructions may be executed by the processing component 422 of the device 400 to complete the above methods. For example, the non-transitory computer-readable storage medium may be a ROM, a random access memory (RAM), a CD-ROM, a magnetic tape, a floppy disk, an optical data storage device, etc.

It may be further understood that, "a plurality of" in the present disclosure means two or above, which is similar to other quantifiers. "and/or", describes the relationship of the association objects, indicating that there may exist three relationships, for example, A and/or B, may represent: any of existing A only, existing both A and B, or existing B only. The character "/" generally means the contextual object is a kind of "or" relationship. The singular forms "a", "the" and "said are also intended to include plural forms, unless the context clearly indicates otherwise.

It should be further understood that, although the terms "first", "second", "third", etc. may be configured to describe various information, such information shall not be limited to these terms. These terms are only used to distinguish the same type of information, rather than indicate a particular order or importance degree. In fact, "first", "second" and other similar descriptions may be used interchangeably. For example, subject to the scope of this present disclosure, first information may also be referred to as second information, and similarly, and second information may also be referred to as first information.

In the present disclosure, the open loop power boosting parameters for the CG PUSCH configuration adopted by the single TRP independent transmission or the multi-TRP cooperative transmission of the TB may be controlled, and an interference control may be further performed, which ensures the reliability of a communication service.

It may be further understood that, even though operations are described in the drawings in a particular order, it should not be understood as requiring that such operations be performed in the particular order shown or in sequential order, or that all illustrated operations be performed to obtain desirable results. In certain circumstances, multitasking and parallel processing may be advantageous.

After considering the specification and practicing the disclosure here, those skilled in the art will easily think of other implementations. The present application is intended to cover any variations, usages, or adaptive changes of the present disclosure. These variations, usages, or adaptive changes follow the general principles of the present disclosure and include common knowledge or conventional technical means in the technical field not disclosed by the present disclosure. The description and the embodiments are to be regarded as exemplary only, and the true scope of the present disclosure are given by the appended claims.

It should be understood that the present disclosure is not limited to the precise structure described above and shown in the drawings, and various modifications and changes may be made without departing from its scope. The scope of the present application is only limited by the appended claims. The scope of the present application is only limited by the appended claims.

What is claimed is:

1. A method for open-loop power control of an uplink configured grant (CG) physical uplink shared channel (PUSCH), performed by a network device, the method comprising:

configuring and determining open loop power boosting parameters corresponding to one or more transmission reception points (TRPs) based on radio resource control (RRC) configuration information, wherein the RRC configuration information is configured to indicate different open loop power boosting parameters for each of one or more CG PUSCH configurations, and the one or more CG PUSCH configurations are CG PUSCH configurations adopted by transmission of a same transport block (TB) in one or more different TRP directions, wherein a single CG PUSCH configuration adopted by transmission of the TB in the one or more different TRP directions is associated with a power control parameter set via sounding reference signal resource indication (SRI) indication information in downlink control information (DCI), and power boosting parameters in the one or more TRP directions are correspondingly obtained; and sending indication information, wherein the indication information is configured to indicate open loop power boosting parameters for a CG PUSCH configuration adopted by a single TRP independent transmission or a multi-TRP cooperative transmission of a TB.

2. The method according to claim 1, wherein the CG PUSCH configuration comprises a CG PUSCH type 1 and a CG PUSCH type 2.

3. The method according to claim 1, wherein the different open loop power boosting parameters are the open loop power boosting parameters corresponding to the one or more TRPs.

4. The method according to claim 1, wherein the single CG PUSCH configuration is associated with the power control parameters using at least one of:

in the presence of an SRI indication field, correspondingly associating power control parameters of one or more TRPs with the single CG PUSCH configuration via SRI indication information corresponding to one or more TRPs and indicated by an SRI codepoint; or in the presence of a plurality of SRI indication fields, correspondingly associating power control parameters of one or more TRPs with the single CG PUSCH configuration via each SRI indication information corresponding to different TRPs.

5. The method according to claim 1, wherein the RRC configuration information configures a plurality of different power control parameter sets, and the plurality of different power control parameter sets are associated with power control parameters of different TRPs.

6. The method according to claim 1, wherein sending the indication information comprises:

sending the indication information via group-common downlink control information (GC-DCI).

7. The method according to claim 6, wherein the GC-DCI is configured to indicate a time-frequency resource location where a time-frequency resource conflict occurs between a terminal and other terminals.

8. A method for open-loop power control of an uplink configured grant (CG) physical uplink shared channel (PUSCH), performed by a terminal, comprising:

determining open loop power boosting parameters corresponding to one or more transmission reception points (TRPs) based on radio resource control (RRC) configuration information, wherein the RRC configuration information is configured to indicate different open loop power boosting parameters for each of one or more CG PUSCH configurations, and the one or more CG PUSCH configurations are CG PUSCH configurations adopted by transmission of a same transport block (TB) in one or more different TRP directions, wherein a single CG PUSCH configuration adopted by transmission of the TB in the one or more different TRP directions is associated with a power control parameter set via sounding reference signal resource indication (SRI) indication information in downlink control information (DCI), and power boosting parameters in the one or more TRP directions are correspondingly obtained;

receiving indication information, wherein the indication information is configured to indicate open loop power boosting parameters for a CG PUSCH configuration adopted by a single transmission reception point (TRP) independent transmission or a multi-TRP cooperative transmission of a TB; and determining the open loop power boosting parameters for the CG PUSCH configuration adopted by the single TRP independent transmission or the multi-TRP cooperative transmission of the TB.

9. The method according to claim 8, wherein the CG PUSCH configuration comprises a CG PUSCH type 1 and a CG PUSCH type 2.

10. The method according to claim 8, wherein the different open loop power boosting parameters are the open loop power boosting parameters corresponding to the one or more TRPs.

11. The method according to claim 8, wherein the single CG PUSCH configuration is associated with the power control parameters using at least one of:

in the presence of an SRI indication field, correspondingly associating power control parameters of one or more TRPs with the single CG PUSCH configuration via SRI indication information corresponding to one or more TRPs and indicated by an SRI codepoint; or in the presence of a plurality of SRI indication fields, correspondingly associating power control parameters of one or more TRPs with the single CG PUSCH configuration via each SRI indication information corresponding to different TRPs.

12. The method according to claim 8, wherein the RRC configuration information configures a plurality of different power control parameter sets, and the plurality of different power control parameter sets are associated with power control parameters of different TRPs.

13. The method according to claim 8, wherein receiving the indication information comprises:

receiving the indication information via group common downlink control information (GC-DCI).

14. The method according to claim 13, wherein the GC-DCI is configured to indicate a time-frequency resource location where a time-frequency resource conflict occurs between the terminal and other terminals.

15. A terminal, comprising:

a processor; and a memory for storing instructions executable by the processor;

wherein the processor is configured to:

determine open loop power boosting parameters corresponding to one or more transmission reception points (TRPs) based on radio resource control (RRC) configuration information, wherein the RRC configuration information is configured to indicate different open loop power boosting parameters for each of one or more CG PUSCH configurations, and the one or more CG PUSCH configurations are CG PUSCH configurations adopted by transmission of a same transport block (TB) in one or more different TRP directions, wherein a single CG PUSCH configuration adopted by transmission of the TB in the one or more different TRP directions is associated with a power control parameter set via sounding reference signal resource indication (SRI) indication information in downlink control information (DCI), and power boosting parameters in the one or more TRP directions are correspondingly obtained;

receive indication information, wherein the indication information is configured to indicate open loop power boosting parameters for a configured grant (CG) physical uplink shared channel (PUSCH) configuration adopted by a single transmission reception point (TRP) independent transmission or a multi-TRP cooperative transmission of a TB; and determine the open loop power boosting parameters for the CG PUSCH configuration adopted by the single TRP independent transmission or the multi-TRP cooperative transmission of the TB.

\* \* \* \* \*